United States Patent
Galletti

(10) Patent No.: US 6,712,299 B2
(45) Date of Patent: Mar. 30, 2004

(54) SELF-FEEDING SHREDDER DEVICE FOR MACHINE TOOLS WITH SWARF REMOVAL

(75) Inventor: Alfonso Galletti, Turin (IT)

(73) Assignee: GI. PI. SRL, Turin (IT)

( * ) Notice: Subject to any disclaimer, the term of this patent is extended or adjusted under 35 U.S.C. 154(b) by 478 days.

(21) Appl. No.: 09/725,688

(22) Filed: Nov. 30, 2000

(65) Prior Publication Data

US 2001/0038050 A1 Nov. 8, 2001

(30) Foreign Application Priority Data

May 4, 2000 (IT) ..................................... T02000A0416

(51) Int. Cl.⁷ ............................................... B02C 19/22
(52) U.S. Cl. ................................................... 241/260.1
(58) Field of Search ........................... 241/36, 260.1, 241/24.11

(56) References Cited

U.S. PATENT DOCUMENTS 4,015,780 A * 4/1977 Hall ............................ 241/23
5,284,303 A * 2/1994 Galletti ..................... 241/24.11

FOREIGN PATENT DOCUMENTS

| EP | 0 738 560 A |   | 10/1996 |
| GB | 1 425 859 A |   | 2/1976 |
| GB | 2 056 399 A |   | 3/1987 |
| JP | 6-134338 A | * | 6/1994 |
| JP | 2000 094 264 A |   | 4/2000 |

* cited by examiner

Primary Examiner—Mark Rosenbaum
(74) Attorney, Agent, or Firm—Sughrue Mion, PLLC

(57) ABSTRACT

A self-feeding shredding device, particularly for liquid lubricant/refrigerant filtration plant for machine tools with swarf removal, incorporating a channel element in which a motorized screw conveyor sits, having one end of reduced diameter that passes through an internally grooved cylindrical body. A lobe rotor is axially faced up against the outside of the grooved cylindrical body and its rotation controlled by the screw conveyor. The swarf, unwound and stretched out from the reduced diameter end tip of the screw conveyor along the grooved cylindrical body, is pushed towards the lobe rotor and shredded.

10 Claims, 4 Drawing Sheets

SELF-FEEDING SHREDDER DEVICE FOR MACHINE TOOLS WITH SWARF REMOVAL

BACKGROUND OF THE INVENTION

The present invention refers in general to machine tools with swarf or chip removal.

Traditionally, in industrial plants that use such machine tools, the relative lubricant/refrigerant liquids and machining swarf are transported, generally via inclined floor-level channels, to filtration plants that separate the solid parts from the liquids so that the latter can be reutilised.

This solution involves evident complications due to the layout of the channels, as well as the space occupied by the channelling and flexibility problems in relation to the positioning of the machine tools.

SUMMARY OF THE INVENTION

Hence, it would be auspicious to eliminate these channels and connect the lubricant/refrigerant liquid discharges from the machine tools with the filtration plant via a network of overhead pipes, which is less complicated, less space-consuming and much more flexible when setting up. Nevertheless, this requirement does not reconcile with the presence of long metal swarf in the lubricant/refrigerant liquids. Such swarf is normally of variable length and even several centimeters long, and therefore cannot be transferred to the filtration plant connection piping using normal hydraulic pumps.

The object of this invention is that of solving this problem and to reduce the swarf length so as to enable the pumping of lubricant/refrigerant liquids containing swarf using normal hydraulic pumps.

According to the invention, this objective is achieved by a self-feeding shredder, characterized by the fact that it consists of a conveyor including a channel element for feeding the lubricant/refrigerant liquids in which a motorized screw conveyor sits, the end tip of which constitutes the advancement member of a shredding group, including an internally grooved cylindrical body arranged coaxially to the said end tip of the screw conveyor and a lobe rotor axially faced against the outside of the said grooved cylindrical body and controlled in rotation by the said screw conveyor.

The combined effect of the rotation of the screw and the presence of the grooves inside the cylindrical body of the shredding group creates an effective unwinding, straightening and stretching action on the elongated particles of metal swarf as they are self-fed to the rotor. The interaction between the lobes of the rotor and the extremity of the grooved cylindrical body faced against it produces a grinding and shredding action, reducing the size and length of the metal swarf particles to levels at which they can be pumped, together with the lubricant/refrigerant liquids, to the filtration plant.

The same advantageous functional result is achieved even in the case the shredding device according to the invention is employed for the mere disposal of the swarf produced by the machine tools, i.e. independently of the presence of a lubricant/refrigerant filtration plant, i.e. independently of the presence of a lubricant/refrigerant filtration plant, and/or of distribution and/or conveying systems for the lubricant/refrigerant liquids and swarf (e.g. even in the case the swarf are removed by means of collecting containers).

In order to render the unwinding and stretching effect on the elongated swarf more efficient, the aforesaid end tip of the screw conveyor has a diameter that is opportunely smaller than that of the rest of the aforesaid screw. This end tip is equipped with an opportune end tang that stands proud of the aforesaid cylindrical body and on which the lobe rotor is engaged for rotation.

Another characteristic advantage of this invention is that the motorised group driving the screw conveyor is equipped with a counter-rotation device, which is set up to automatically intervene during normal running in cases where rotation of the screw slows down or stops due to swarf clogging or blockages.

BRIEF DESCRIPTION OF THE DRAWINGS

The invention will now be described in detail with reference to the attached drawings, which are supplied purely as a non limitative example, wherein.

DETAILED DESCRIPTION OF THE INVENTION

Figure 1:
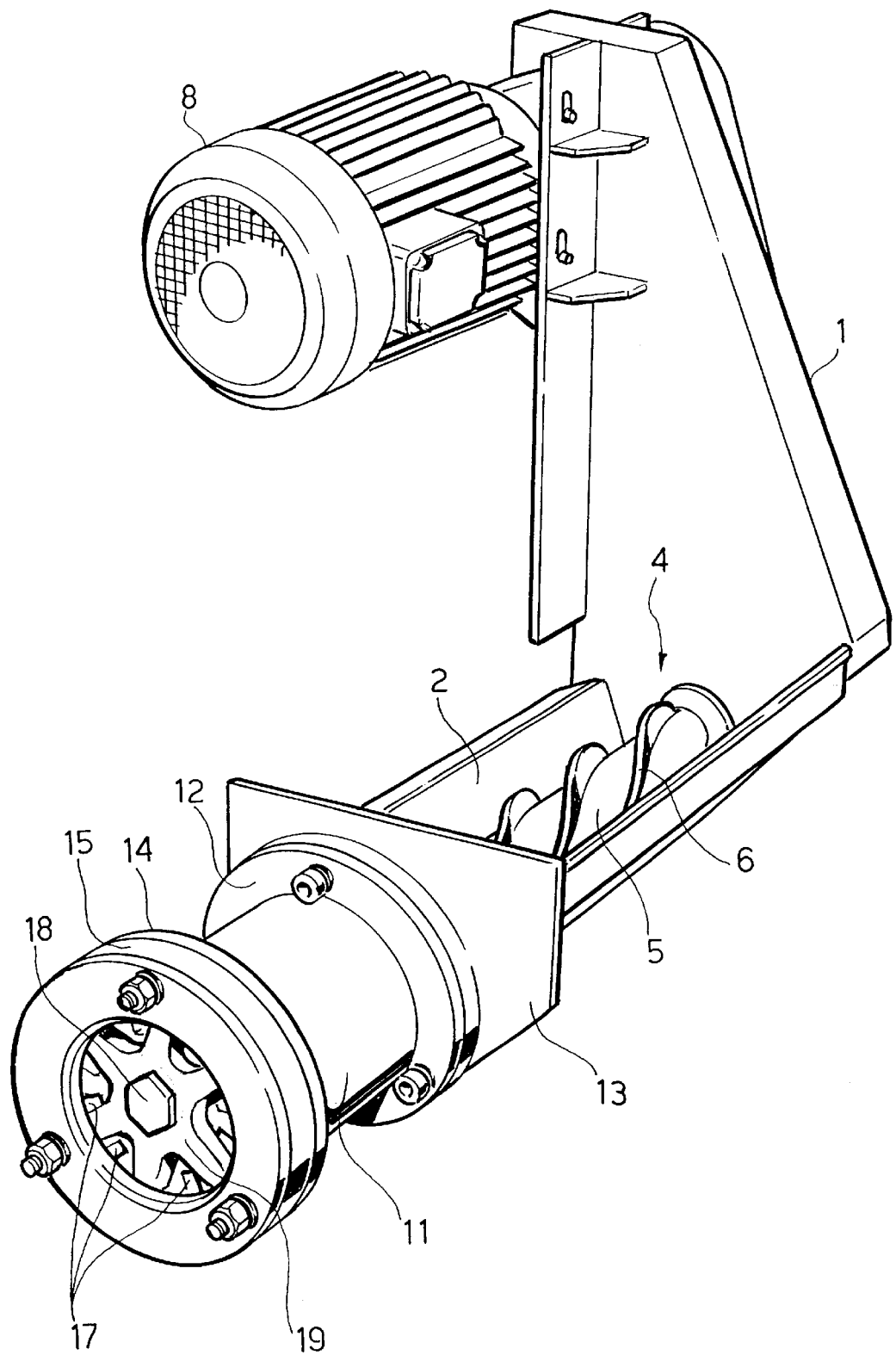
FIG. 1 is a schematic perspective of a self-feeding shredding device according to the present invention.
Figure 2:
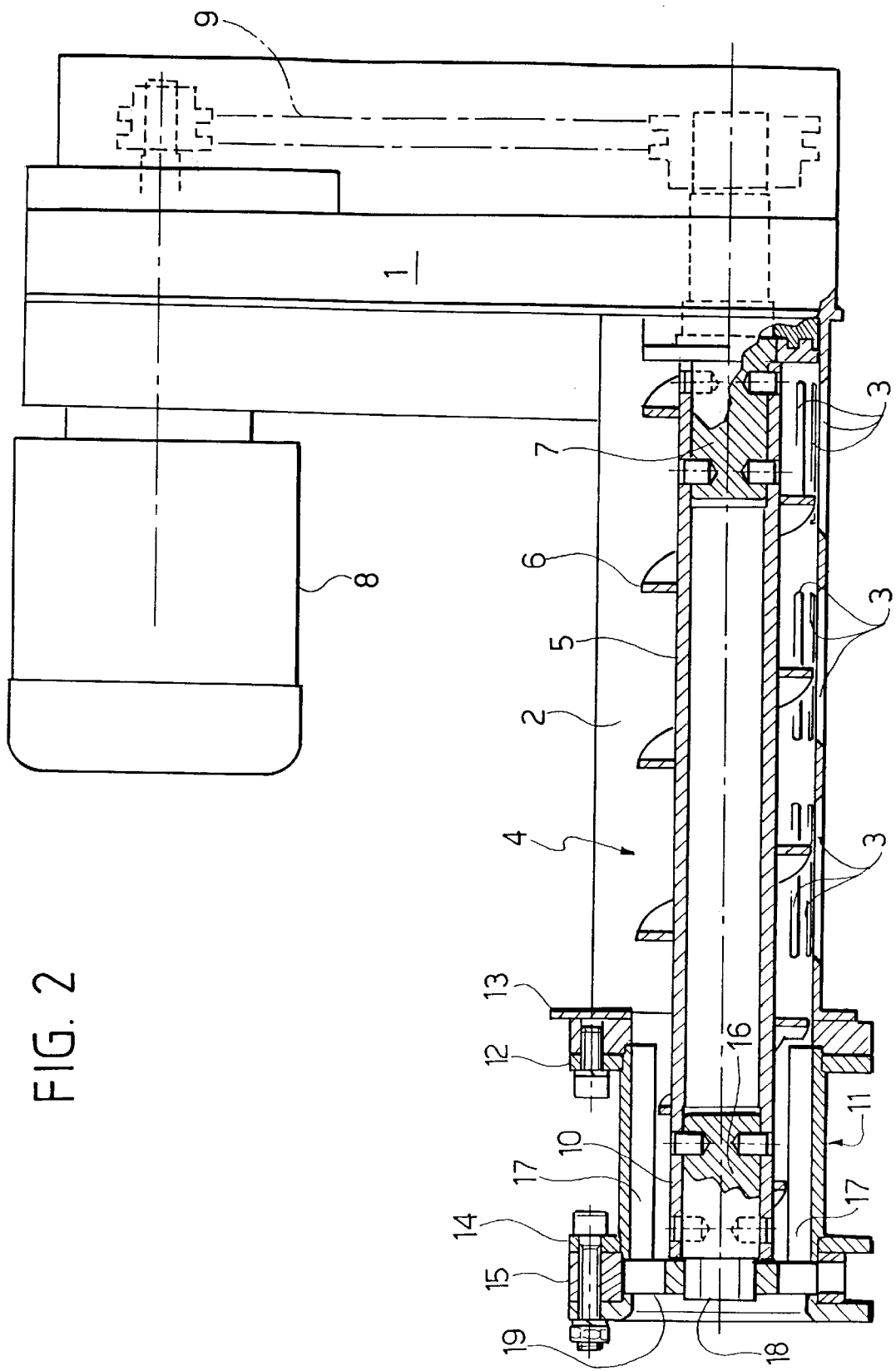
FIG. 2 is a longitudinal, side-section view of FIG. 1.
Figure 3:
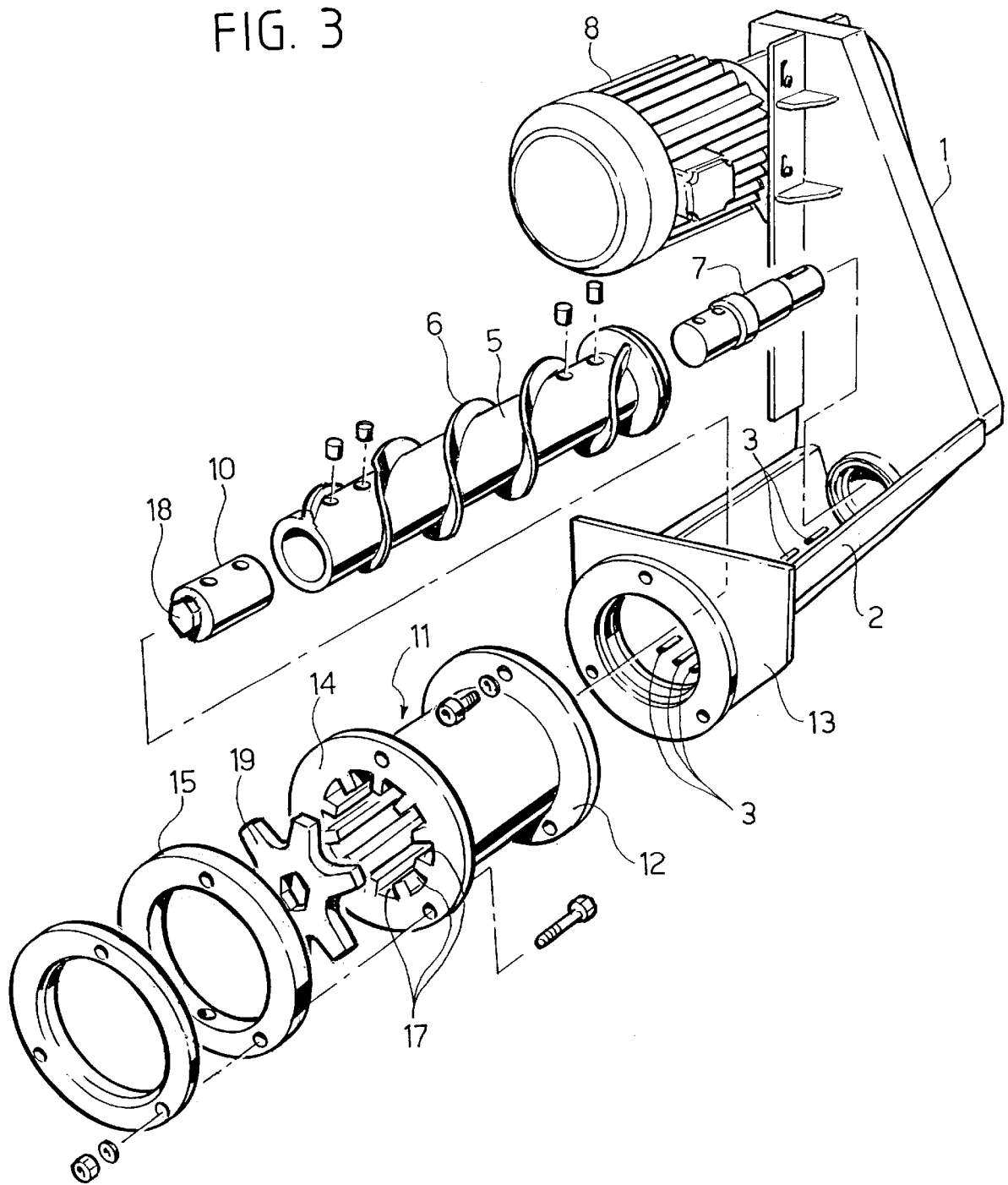
FIG. 3 is an exploded view of FIG. 1.

According to the present invention, the self-feeding shredding device, as exemplified in the drawings, includes a support frame, generically indicated as item 1, arranged for mounting in correspondence with the lubricant/refrigerant liquids outlet of a machine tool or group of machine tools with swarf removal.

The lower part of the support frame (1) carries a horizontal channel element (2), the bed of which has a series of slots (3) and in which a motorised screw conveyor (4) sits.

In the example shown, the screw conveyor (4) incorporates a long tubular element (5) with the blade (6) of the screw mounted on its external surface and coupled at one end to a shaft (7). The shaft (7) is mounted on the frame (1) using, for example, roller bearing supports (not shown) to allow rotation and is connected to a motorised drive group. In the case of the example shown, this group is comprised of an electric motor and a chain drive indicated schematically as 9.

A counter-rotation device is opportunely coupled with the motorised drive group. This counter-rotation device might incorporate a sensor for the angular speed of the shaft (7) or an absorption sensor for supply current to the motor (8), suitable for automatically controlling—for motives explained in the following—the halting and rotation of the screw conveyor (4) in the opposite direction to that of normal running for a predetermined number of revolutions.

The height of the screw blade (6) is reduced in correspondence with the end tip (10) of the screw conveyor (4). This tip (10) passes coaxially through a cylindrical sleeve (11) having on its inner circumference a series of grooves (17), which may be oriented axially or with an angle relative to the axis of the sleeve (11), and is fixed at one end, via a flange (12), to a vertical support plate (13) that is, in turn, rigidly fixed to the channel element (2). The other end of the grooved cylindrical sleeve (11) has another flange (14) onto which a bottom ring (15) is fixed.

An axial tang (16) coupled in rotation within the end tip (10) of the screw conveyor (4) has a prismatic tip (18) onto which a lobe rotor (19) is keyed.

Figure 4:
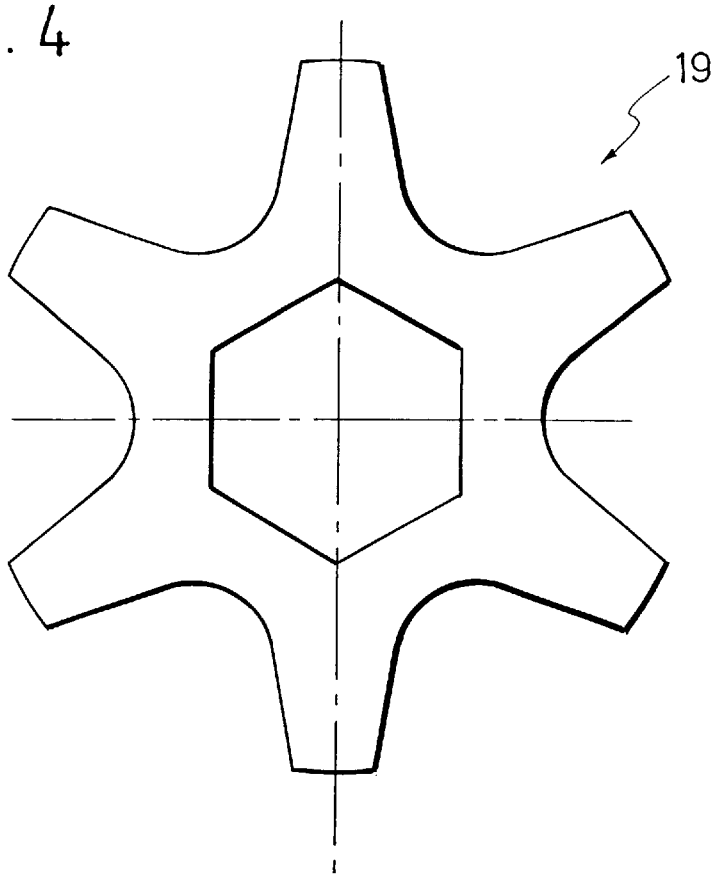
FIG. 4 is a larger-scale front view of a first example of lobe rotor actuation on the shredding device.
Figure 5:
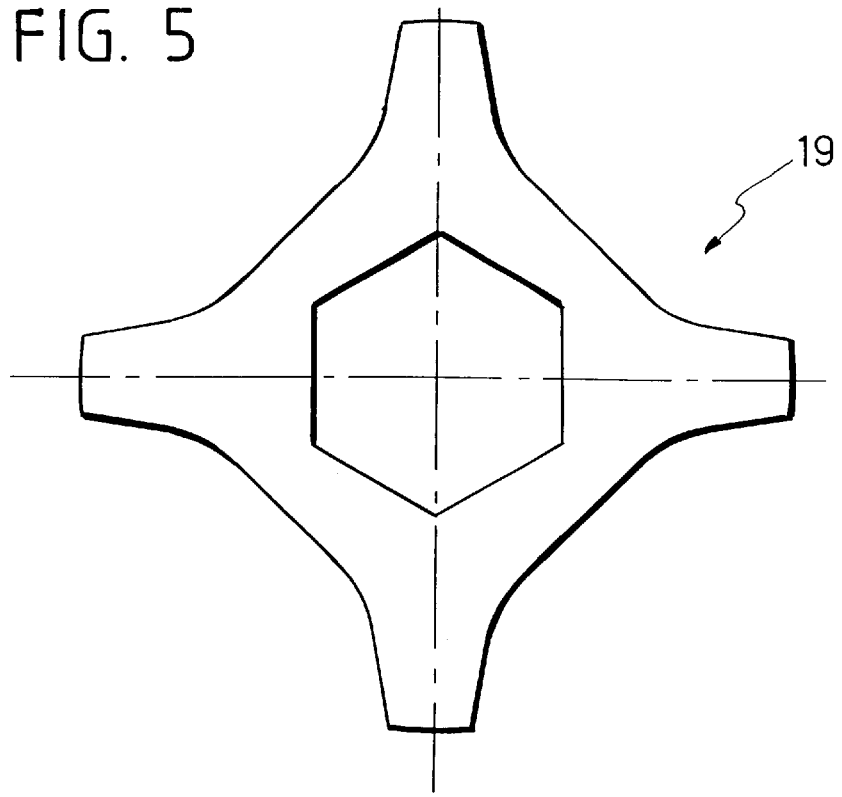
FIG. 5 is a similar view of a second type of lobe rotor actuation.

This rotor (19), which axially faces the external end of the grooved cylindrical body (11), can have from 2 to n lobes: FIGS. 4 and 5 show two examples of alternative implementations in which the rotor has respectively six and four lobes, or radial arms. In operation, the lubricant/refrigerant liquid and small-size swarf are discharged under gravity from the bed of the channel element (2), via the relative slots (3), to a collection tank for pumping to the filtration plant.

Longer particles or accumulations of swarf are transferred by the screw conveyor (4) in the direction of its end tip (10). Due to the reduced height of the screw blade (6) and the presence of the grooved cylindrical body (11), the swarf is subjected to an unwinding and stretching action in this end tip zone (10), whilst being simultaneously advanced in the direction of the rotor (19). Due to the effect produced by the interaction between the edges of the lobes of the rotor (19) and the end of the cylindrical body (11) facing them, the swarf is subjected to a grinding and shredding action.

Following this grinding and shredding action the swarf, which leaves the device via the bottom ring (19), reaches the collection tank where it is pumped with the lubricant/refrigerant liquid to the filtration plant. In cases where swarf amasses and clogs in the end tip (10) zone to the extent that it causes the rotation of the screw conveyor (4) to slow down or even stop, the previously described counter-rotation device will automatically rotate the said screw conveyor (4) in the opposite direction for a brief period of time to restore normal operating conditions. Nevertheless, it is necessary to underline that the risk of swarf blockage is reduced by the fact that the end tip (10) of the screw conveyor (4) is not supported, but is free to float radially with respect to the grooved cylindrical body (11).

Naturally, it is understood that the constructional details and the forms of realization could be extensively changed with respect to that described and illustrated without leaving the scope of this invention, as defined in the following claims. Thus, as already pointed out in the above, the shredding device according to the invention can also be advantageously employed for the mere disposal of the swarf produced by the machine tools, i.e. even in the absence of lubricant/refrigerant filtration plants, i.e. independently of the presence of a lubricant/refrigerant filtration plant, and/or of distribution and/or conveying systems for the lubricant/refrigerant liquids and swarf (e.g. even in the case the swarf are removed by means of collecting containers).

What is claimed is:

1. A self-feeding shredding device for machine tools with swarf removal, including a conveyor incorporating a channel for feeding lubricant/refrigerant liquids and in which a motorised screw is positioned, said screw having an end tip which constitutes a drive member for a shredding group including an internally-grooved cylindrical body arranged coaxially with respect to said end tip of said screw and a lobe rotor connected to said end tip of said screw and axially disposed against an outside end of said grooved cylindrical body and rotationally driven by said screw.

2. A shredding device according to claim 1, wherein said end tip of said screw has a smaller diameter than the rest of the said screw conveyor.

3. A shredding device according to claim 1, wherein said end tip of said screw has an end tang that stands proud of said grooved cylindrical body and on which said lobe rotor is coupled for rotation.

4. A shredding device according to claim 3, wherein said lobe rotor is inserted inside a bottom ring frontally fixed to said grooved cylindrical body.

5. A shredding device according to claim 1, wherein said lobe rotor is equipped with a number of lobes ranging from 2 to n.

6. A shredding device according to claim 1, wherein said channel element is equipped with bottom openings.

7. A shredding device according to claim 1, wherein said screw has an initial end functionally connected to a drive group equipped with an automatic counter-rotation device.

8. A shredding device according to claim 1, wherein said cylindrical body has axially-arranged grooves.

9. A shredding device according to claim 1, wherein said cylindrical body has grooves angled with respect to an axis thereof.

10. A shredding device according to claim 1, wherein said end tip of said screw is radially floating with respect to said grooved cylindrical body.

* * * * *